(No Model.)
J. CURRIER.
CARRIAGE.
No. 499,452.
Patented June 13, 1893.
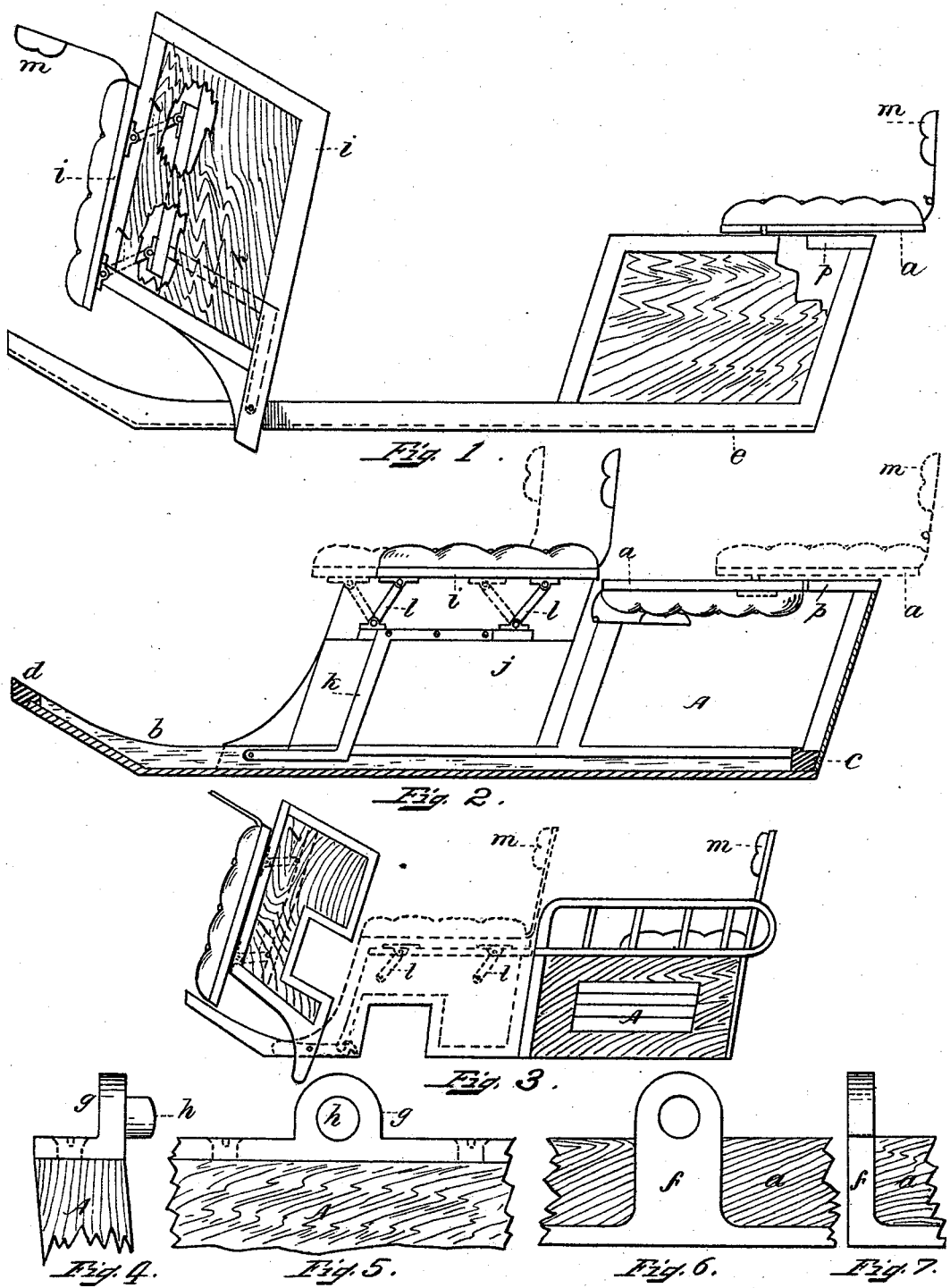

UNITED STATES PATENT OFFICE.

JOHN CURRIER, OF AMESBURY, MASSACHUSETTS.

CARRIAGE.

SPECIFICATION forming part of Letters Patent No. 499,452, dated June 13, 1893.

Application filed January 6, 1893. Serial No. 457,537. (No model.)

*To all whom it may concern:*

Be it known that I, JOHN CURRIER, of Amesbury, in the county of Essex and State of Massachusetts, have invented a new and useful Improvement in Carriages, which will, in connection with the accompanying drawings, be hereinafter fully described, and specifically defined in the appended claims.

In said drawings Figure 1 is a side elevation of a carriage body and seats, with my invention thereto applied. Fig. 2 shows the same body and seats in longitudinal vertical section. Fig. 3 shows the same parts as in Fig. 1 except that the body is of the cut under style; and it is somewhat diminished in scale from Figs. 1 and 2. Fig. 4 is an elevation taken at the left of Fig. 5. Fig. 5 is an end view of Fig. 4. Fig. 6 is an elevation taken at the left of Fig. 7; and Fig. 7 is a view taken at the right of Fig. 6.

The object of my invention is to change the front seat of two-seat vehicles so that when the front seat is employed as the sole seat it can be arranged nearer the center of the body than when it is used in connection with a rear seat; and the invention consists in so connecting the top portion of the front seat with the seat base or bottom that said top portion can be adjusted in either a forward or rearward position, while the entire seat can be turned forward in order to create a space between the front and rear seats by which the passengers may enter or leave the rear seat.

It also consists in so hinging the rear seat to the body that it can be turned out to serve as a seat, or turned over to serve as a deck panel, as will be hereinafter described.

Referring again to said drawings, A represents the body, which is provided with the usual side sills $b$, the rear cross sill $c$, the front cross sill $d$ and the floor $e$. The rear seat is shown at $a$ and has secured to it the iron $f$ (see Figs. 6 and 7), which iron is connected with pivot $h$ formed upon iron $f$ that is secured to side A of the body. This rear seat when turned to the rear extends far enough back of pivot $h$ to set steadily upon the top edge of the back panel of body A, as shown; and when turned forward its then front edge (which when opened is the rear edge) fits against the rear edge of front seat $i$, while at the opposite edge it fits against a piece $p$ that is secured to and extends across the body. The front seat is shown at $i$, which is connected with base $j$ that is, by irons $k$, pivoted to the body; while the seat proper is connected with base $j$ by the jumping irons $l$ which allow the front seat to be adjusted to its rearward position when it is used as a single seat, and to occupy its forward position when it is used in connection with the rear seat. These seats can be arranged upon a body that has straight side sills, or that is cut under, as shown in Fig. 3; and the front seat may turn over forward as shown, or it may be arranged to jump forward retaining at the same time a level position, or it may be made to slide forward. The rear seat has a lazy back $m$ that is closed down when it is turned over to serve as a deck panel; and the front seat is provided with a back $n$ as shown; but these seats may be provided with different backs if preferred. The irons $l$ by which the front seat is moved back and forth can be formed with feet that will limit the jumping movement, in a well known manner, or the seat can be so arranged that when jumped in either direction it will rest upon the base $j$; or the front seat may be made to slide forward.

I am aware that jump seats are common and well known, and I do not herein broadly claim such a seat, my invention in that behalf relating to a jump seat mounted upon a movable base as already stated.

I claim as my invention—

1. The front seat of a two seat carriage connected by jumping irons with a base, also pivotally connected with the body, whereby the front seat may be arranged at varying distances from the front of the carriage, as specified.

2. In a two seat vehicle, the rear seat $a$ secured to the body sides at $g$ with a piece $p$ extending across body A, so as to allow seat $a$ to fill the space between seat $i$ and said piece $p$, substantially as specified.

JOHN CURRIER.

Witnesses:
T. W. PORTER,
J. D. THOMSON.